United States Patent
Smetana et al.

(10) Patent No.: US 6,430,186 B1
(45) Date of Patent: Aug. 6, 2002

(54) ASYNCHRONOUS BIT-TABLE CALENDAR FOR ATM SWITCH

(75) Inventors: Denis A. Smetana, Manassas, VA (US); Brian D. Holden, Sunnyvale, CA (US); Imran N. Chaudhri, North Potomac, MD (US); Edward Lennox, Saratoga, CA (US); Richard A. Smedley, Columbia, MD (US)

(73) Assignee: PMC-Sierra, Inc. (CA)

( * ) Notice: Subject to any disclaimer, the term of this patent is extended or adjusted under 35 U.S.C. 154(b) by 0 days.

(21) Appl. No.: 09/134,635

(22) Filed: Aug. 14, 1998

Related U.S. Application Data (63) Continuation-in-part of application No. 08/616,875, filed on Mar. 15, 1996, now Pat. No. 5,844,901.

(51) Int. Cl.[7] .............................................. H04L 12/56
(52) U.S. Cl. .................................................. 370/395.4
(58) Field of Search ................................ 370/395, 401, 370/459, 409, 410, 412, 413, 419, 471, 473, 474, 498, 537, 538, 905, 396, 397, 398, 399, 395.4

(56) References Cited

U.S. PATENT DOCUMENTS

| | | | | |
|---|---|---|---|---|
| 5,301,055 A | * | 4/1994 | Bagchi et al. ............... | 359/139 |
| 5,394,397 A | * | 2/1995 | Yanagi et al. ................ | 370/390 |
| 5,491,691 A | * | 2/1996 | Shtayer et al. ............... | 370/395 |
| 5,533,020 A | * | 7/1996 | Byrn et al. ................... | 370/395 |
| 5,563,885 A | * | 10/1996 | Witchey ....................... | 370/391 |
| 5,572,522 A | * | 11/1996 | Calamvokis et al. ........ | 370/390 |
| 5,583,861 A | * | 12/1996 | Holden ......................... | 370/395 |
| 5,844,901 A | * | 12/1998 | Holden et al. ............... | 370/399 |
| 5,982,749 A | * | 11/1999 | Daniel et al. ................ | 370/233 |
| 6,188,690 B1 | * | 2/2001 | Holden et al. ............... | 370/390 |

* cited by examiner

*Primary Examiner*—Chau Nguyen
*Assistant Examiner*—Jasper Kwoh
(74) *Attorney, Agent, or Firm*—Townsend and Townsend and Crew, LLP; Kenneth R. Allen

(57) ABSTRACT

A segmentation and reassembly processor (10) is disclosed for use in interfacing a group of time-division multiplexed lines (25) to a cell-based communication environment (20). The SAR uses a bit-table calendar (100) to schedule cells to be sent to the cell-based network. A cell service decision circuit (50) reads frame events from a frame advanced FIFO (40) and signals a cell builder (60) to assemble cells of data from a frame buffer (70) for transmission to a cell based output (50).

3 Claims, 9 Drawing Sheets

(PRIOR ART)

ASYNCHRONOUS BIT-TABLE CALENDAR FOR ATM SWITCH

This application is a continuation-in-part of Ser. No. 08/616,875 now U.S. Pat. No. 5,844,901, filed Mar. 15, 1996, the disclosure and appendices of which is incorporated by reference. Related technology is discussed in Ser. No. 08/988,940 now U.S. Pat. No. 6,188,690, filed Dec. 11, 1997, the disclosure and appendices of which is incorporated by reference.

BACKGROUND OF THE INVENTION

The present invention relates to electronic circuits and to digital communication. More particularly, the present invention relates to a bit-table calendar for translating digital communications between a time-division multiplexed (TDM) domain and a cell-based asynchronous transfer mode (ATM) domain.

The present invention has a number of applications in advanced telecommunication systems and networks. One envisioned application of the invention is for use in state-of-the-art telephone central office (CO) switching systems to connect local T1 TDM lines in one area to T1 TDM lines in different area through a high performance ATM backbone. Another application would be at the site of an institutional customer such as a company or research or educational institution for connecting a T1 line provided by a public telephone network to a local ATM network.

This discussion presupposes some familiarity with ATM cell-based switch methodology, such as that described in detail in co-assigned U.S. patent application Ser. No. 08/235,006, filed Apr. 28, 1994, now U.S. Pat. No. 5,583,861, entitled ATM ARCHITECTURE AND SWITCHING ELEMENT, which is hereby incorporated by reference. The present discussion also presumes some familiarity with commonly TDM technology such as that employed in widely available T1 lines used and leased by public telephone companies throughout the United States and E1 lines used in other countries.

Explanation of both the prior art and the invention will be better understood with reference to specific examples, however this should not be taken to limit the invention to the particular examples described. The invention is generalizable to other similar types of communication interfaces and the invention should therefore not be limited except as provided in the attached claims.

T1 type TDM service is a widely used, medium speed digital communication service provided by, among others, public telephone companies in the United States. E1 service is a similar service provided in Europe. A T1/E1 line is conceived of as a single point to point serial digital communication line operating at an overall data speed of 1.544 Mb/s for T1 and 2.098 Mb/s for E1. Serial data on a T1 or E1 line is divided into 125 microsecond intervals, called frames, and each frame is further divided into TDM time slots. T1 lines have 24 slots per frame, and E1 lines have 32 slots per frame. Each T1/E1 slot has a speed of 64 Kb/s: 1/24th of the overall T1 speed or 1/32nd of the overall E1 speed. Each T1/E1 slot can carry an independent serial digital data signal, for example a digitally encoded telephone call. Therefore a single T1 line can carry 24 concurrent telephone calls. Data is routed to a particular telephone call used on which slot it is located. The format of data on a T1 line is shown in diagram 2 of FIG. 1.

Public telephone companies typically sell the capacity on a T1 line on a slot by slot basis, and a user wishing high speed data communication can buy any number of slots. Slots can be aggregated into higher speed channels with the effective channel speed being the combined speed for the number of slots. A standard T1 line can have as many as 24 channels, each having a data rate of 64 Kb/s, or as few as one channel with a data speed of 1.544 Mb/s. A T1 line that is divided into more than one channel is sometimes referred to as "structured line" and a T1 line that carries only one channel is referred to as an "unstructured line." For example, a company having a main office in San Francisco and a satellite office in Palo Alto, might for example, lease eight T1 slots between the two offices and use four of the slots for four separate voice channels and aggregate the four other slots into a single higher speed data channel. The company would therefore have five channels, four at 64 Kb/s for voice, and one at 0.25 Mb/s for data.

In some areas, phone companies have begun to install a new switching architecture into their central offices for use in CO to CO communication. This technology is referred to as cell-based ATM (Asynchronous Transfer Mode) switching. Cell-based ATM switching is designed to effectively serve the needs of both continuous low-bandwidth digital voice data and bursty high-bandwidth data. At the heart of cell-based switching is the cell, a small unit of data with an address identifying its destination and path through the ATM network. The standardized ATM network protocol employs an cell of 53 bytes, 48 bytes of data and 5 bytes of ATM header. The destination of data on an ATM line is determined by the cell header and not by the slot location within a frame as in TDM. Therefore ATM is said to be asynchronous. ATM data transfer speeds are typically much higher than the speed of a T1 line. A typical ATM line operates at 155 Mb/s, or about 100 times faster than a T1 line.

As telephone and digital system carriers have begun adopting cell-based switching for some parts of communication networks, a need has arisen for connecting existing TDM lines into new cell-based ATM switches. This need has been filled by a device referred to in the art as an SAR Processor (SAR stands for Segmentation and Reassembly). An SAR processor provides an interface between a number of TDM lines and a cell-based ATM switch network. The SAR processor typically accomplishes this by collecting data received on a TDM channel in groups of 47 data bytes, and then putting that data into an ATM cell (which has 48 data bytes) for transmission over an ATM switch. The SAR adds one byte of its own header information to each cell, and in some applications adds an additional one byte of data every eight cells for timing purposes. An ATM cell leaving the SAR therefore contains 47 bytes of TDM data for most cells, with possibly every 8th cell for structured lines containing only 46 bytes.

Figure 1:
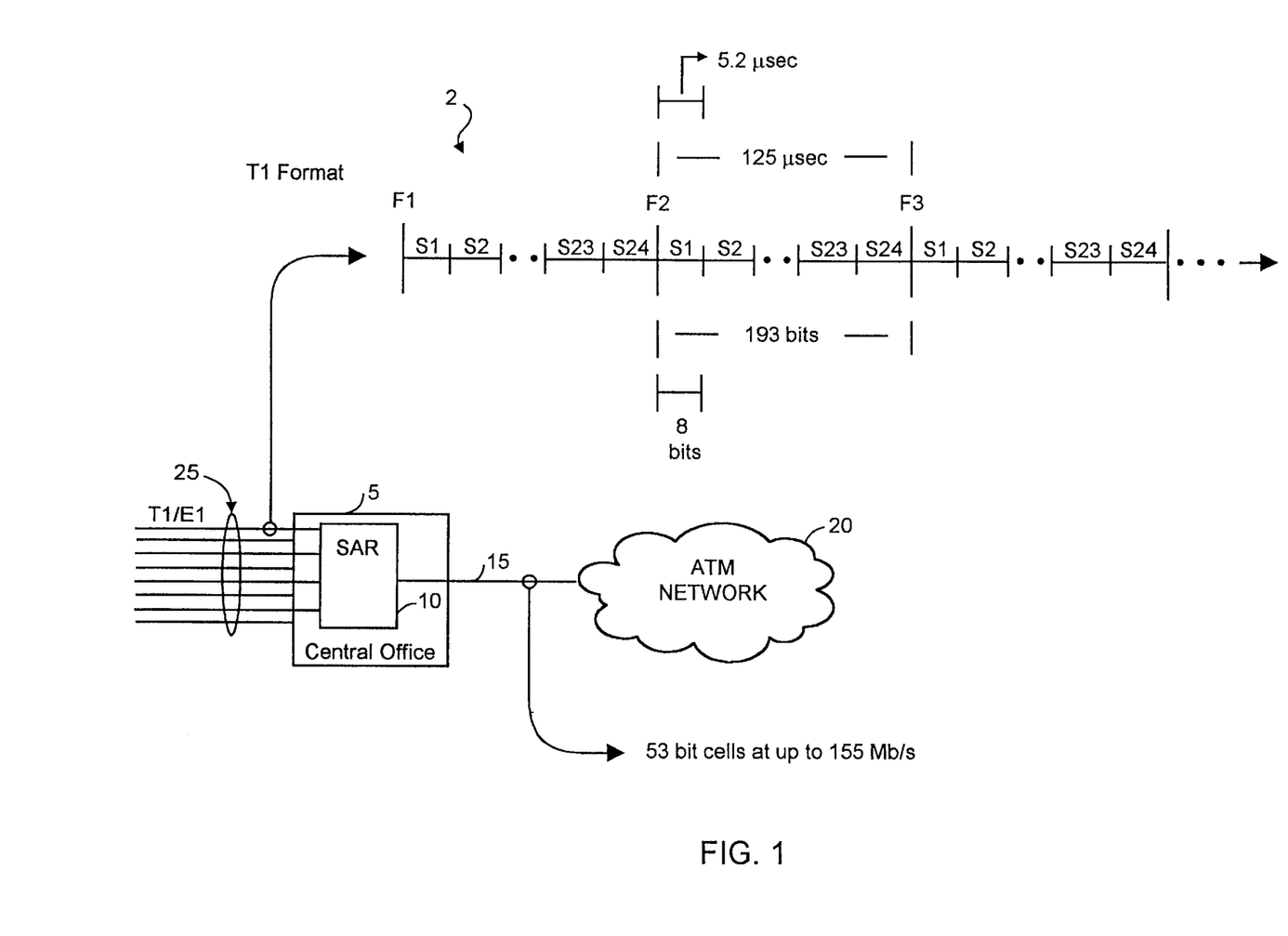
FIG. 1 is a block diagram illustrating a central office with an SAR connecting T1 lines to an ATM network in which the present invention may be employed.

FIG. 1 illustrates some of these concepts in a block diagram showing a central office 5 having an SAR 10, connected to an ATM network 20. As shown in FIG. 1, SAR 10 connects to eight T1 or E1 TDM lines 25 at its TDM interface and to one ATM interface line 15 at its ATM interface. Line 15 is one input into ATM network 20, which may be partly located in CO 5. In the embodiment shown, when these eight interface lines are E1 lines, they can define as many as 256 independent TDM channels, with up to 32 channels per line, or they can define as few as eight high speed channels, with each TDM line carrying one channel. When lines 25 are T1 lines, they can contain up to 192 channels. The format of data on one T1 line is shown in diagram 2.

A basic function of SAR 10 is the temporary storing of data received on lines 25 and the scheduling of data out of the ATM interface line 15. Data is transmitted on line 15 in fixed-width ATM cells at a fixed high speed, and the data rate on the ATM line is typically about 100 times faster that the data rate on any one T1/E1 line. The amount of time it takes to transmit one ATM cell on line 15 is referred to as the ATM cell-time. Data is transmitted on lines 25 on a variable number of channels at various speeds depending on the number of slots allocated to a channel. SAR 10 must buffer this incoming data on various channels until enough data is collected to make an ATM cell (47 bytes) and then must transmit that cell on ATM line 15. SAR 10 must allocate the data space on line 15 fairly among all the TDM channels to insure that delay is kept to a minimum on each channel.

Deciding from which of the 256 possible TDM channels to send a cell during each ATM cell-time is non-trivial. One of the factors that makes the decision complex is that different types of data carried on different channels may be either very sensitive or very insensitive to different types of delay. One kind of delay of concern is the actual cell delay through an SAR, i.e., how much delay is there between an input bit and the subsequent output of that bit. This delay is referred to as latency. A second and often more important type of delay is jitter, or CDV (Cell Delay Variation). This delay refers to the amount of variation in delay that different cells on one channel experience as they are being transmitted through the communications network. Digitized voice data, for example, is very sensitive to CDV. In many common types of voice systems, serial bits must be received at the voice device at the expected speed with no gaps due to CDV. Gaps would cause static or popping which would be intolerable in voice communication. TDM voice data is therefore particularly sensitive to any CDV that results in a slot of voice data not being delivered immediately after the preceding slot. Computer data traffic, on the other hand, is often insensitive to CDV. It, however, can use a lot of bandwidth for short periods of time and so can cause delay in other channels if network resources are not managed well.

A number of methods for scheduling cells from particular channels in a device like SAR 10 have been implemented or discussed in the art. One method for scheduling cells from the TDM lines is the FIFO (First In/First Out) method. According to this method, as soon as a cell from a particular channel is full, it is put in line to be transmitted and is then transmitted through the ATM switch. In a FIFO system, the SAR generally must poll each channel in some particular order to determine when a channel has collected enough data to complete a cell. The FIFO method has the advantage that it is simple to implement. The switch element described in the above referenced co-assigned patent application uses a FIFO queuing technique with proportional bandwidth queues. When that switch element receives a cell of data, it assigns it a certain priority. The switch determines which priority will be served next according to its proportional bandwidth queuing table and then selects the next cell to play according to the FIFO for that priority. One problem with FIFO queuing is that it tends to aggregate all the data flowing through the switch and it therefore cannot finely control the transmission behavior on a particular channel.

Another method for scheduling cells is the use of a calendar circuit. In a calendar circuit, channels are scheduled on a calendar in advance of when they are to be sent. Calendars have the advantage that it is possible to schedule cells from particular channels to achieve many goals, such as minimizing delay on some channels or ensuring fairness between high bandwidth channels by scheduling the cells rather than simply sending a cell that from a channel has a full cell first.

A calendar circuit maintains a table listing each of the active channels. The calendar is responsible for indicating when cells from each of those channels should be sent. The traditional calendar treats the channels independently and schedules in the calendar table when the next cell will be transmitted from that channel. When a new channel is activated, its channel number is placed into the calendar at the next empty time slot. When the playout time reaches that entry, the next cell for that channel is sent and if there is further data from that channel, another cell from that channel is scheduled into the calendar, based on a calculation of the interval between the current time and the future time when the cell can be played out.

Figure 2:
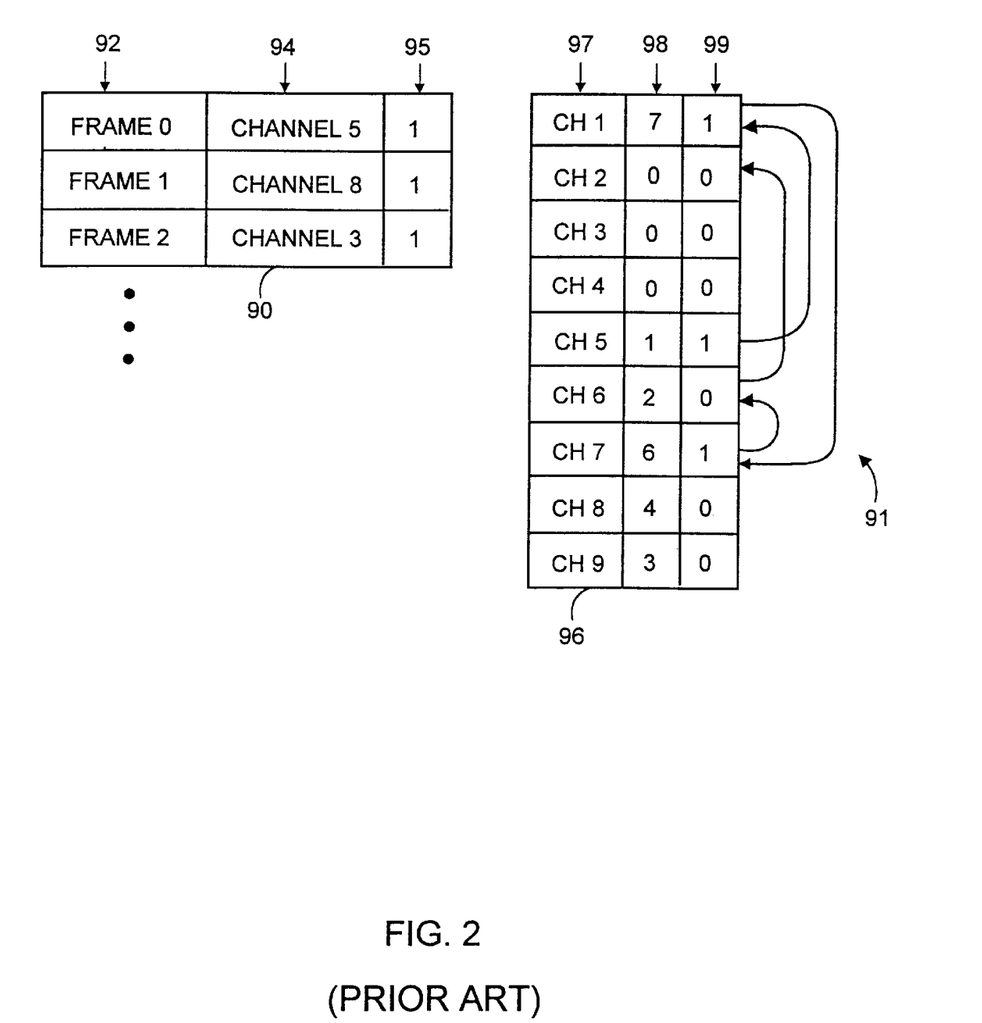
FIG. 2 is a simplified block diagram of a linked list calendar queue according to the prior art.

Traditional calendar queues are quite large and cumbersome entities because they are generally implemented as linked lists. An example of a linked list is shown in FIG. 2. In a linked list implementation, the calendar maintains a table 90 indexed by frame number 92. Each entry 93 in the table contains an identifier 94 of a channel and a bit 95 indicating whether said channel is the end or tail of the list for that frame number. When the calendar circuit is ready to send out channels at that frame number, the calendar must first look up the entry in link list 90 at that frame number, and then send out a cell for the channel listed in that entry. If the bit 95 at that frame number indicates that the channel is not at the tail of the list, the calendar must then look up in a second list 96 indexed by channel identifier 97 to determine the next channel in the linked list. In this second list, each entry contains a channel identifier 98 for a next channel in the list and a bit 99 indicating whether that channel is the tail channel. The calendar then sends a cell from the channel indicated in that second list, and if that channel is not the tail of the list, the calendar then looks in the entry for that channel to find the next channel in the linked list. In this way, the calendar must traverse the list link by link for each frame until a tail is reached. An example of this is shown as path 91 in the figure.

A linked list implementation of a calendar requires a large amount of complex circuitry to handle the various linked list lookups. This circuitry is difficult to design and debug and uses a significant amount of space on a VLSI circuit. Linked lists also require more time to accomplish the lookups in the list as well as updates to the list because adding and deleting entries in a link list requires traversing the entire link list to reach the tail. Other implementations of linked lists designed to eliminate this problem implement yet another table to indicate the tail of each linked list, but this other table requires still more circuitry and still more processing to update each time the linked list is modified.

What is needed is a type of calendar circuit maintaining the advantages of linked list tables but without the complex and expensive calculations and circuitry that the traditional link list implementation require.

SUMMARY OF THE INVENTION

The present invention implements a calendar circuit without the use of linked lists and instead maintains a table of bits that are set to schedule data transmissions from a channel. In a particular embodiment, the present invention has a series of bit tables, one for each T1/E1 line, the tables having a bit location for each possible channel at each of a set number of future frame. In this way, the present invention achieves a superior calendar circuit having a very small and efficient implementation.

DETAILED DESCRIPTION OF THE DRAWINGS

Returning to FIG. 1, an SAR 5 is shown in a communication system in which the invention may be effectively employed. As described above, SAR 5 must effectively connect the eight medium speed T1/E1 lines 25 to a single very high speed cell-based ATM line 15 and must package the data on the up to 256 TDM channels into ATM cells.

Figure 3A:
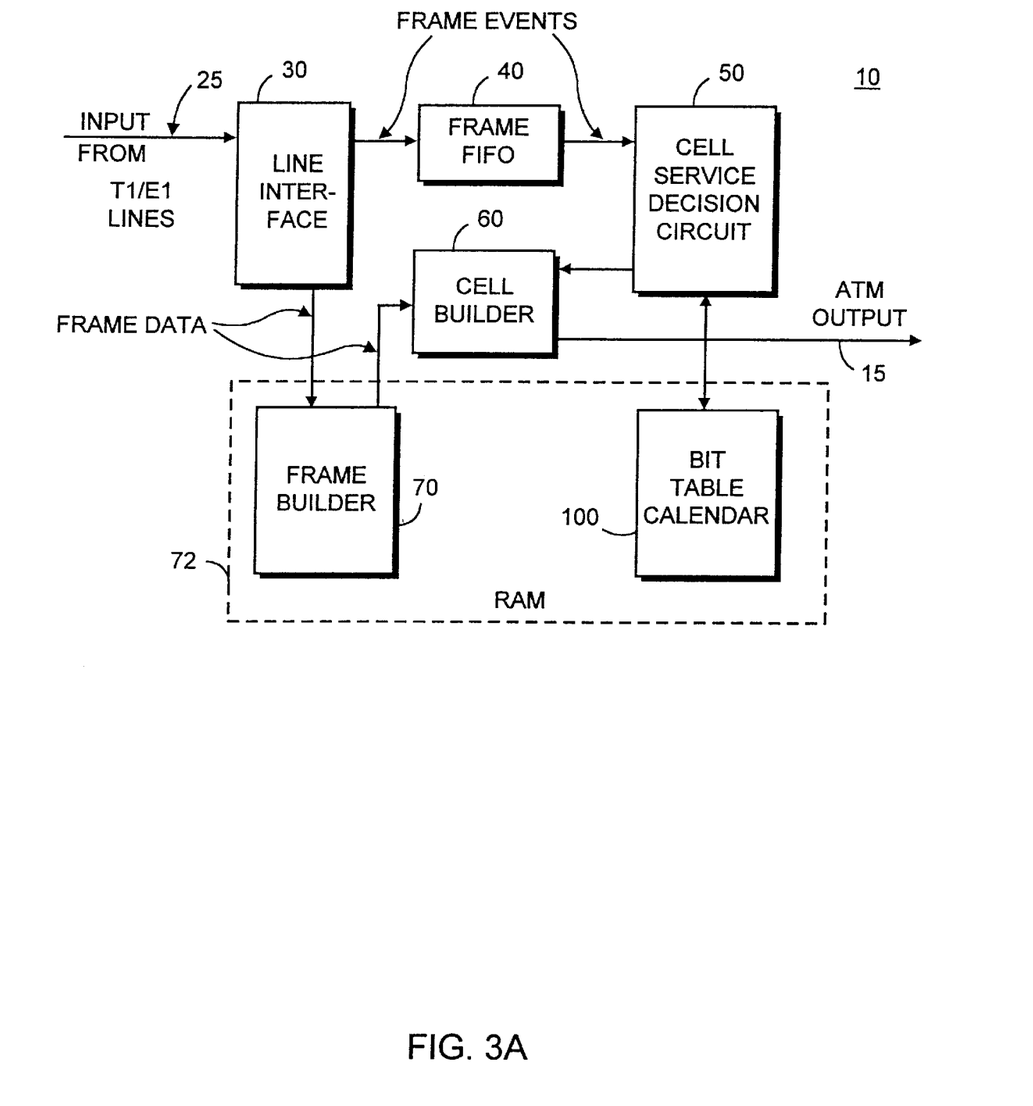
FIG. 3A is a simplified block diagram of an SAR according to the present invention.

FIG. 3A is a block diagram of the details of SAR 10 according to the invention. Input lines 25 are received at SAR 10 by a line interface 30. The line interface 30 stores incoming data on the lines 25 in a frame buffer 70. According to an embodiment of the invention, this data is stored in the frame buffer 70 in roughly the same format that it is received on lines 25. Line interface 30 also is responsible for detecting frame boundaries on each of the lines 25. These frame boundaries are referred to as frame events and on the occurrence of any frame event an entry is made in frame FIFO 40. Entries in frame FIFO 40 include the frame number of a detected frame event and an identifier identifying on which T1/E1 line 25 the frame event occurred. Frame FIFO 40 is one important aspect of the invention because the invention is able to achieve a minimum cell delay variation and fairness, as explained below, by servicing frames in the order in which they occurred; this order is maintained by frame FIFO 40. Cell service decision (CSD) circuit 50 detects the presence of an entry in FIFO 40 and as a result of the presence of an entry in frame FIFO 40, CSD 50 determines which channel on that line should be serviced next and signals cell builder 60 to build a cell from that channel and send the cell out on ATM line 15. Cell builder 60 extracts frame data from frame buffer 70 in response to signals from CSD 50. After the cell builder 60 extracts data from frame buffer 70, cell builder 60 marks the corresponding locations in frame buffer 70 as released, therefore allowing new data from line interface 30 to be stored in those locations in frame buffer 70. When SAR 10 is operating without error, cell builder 60 will have sent enough data out of frame buffer 70 to free space for the next frame of data received on a particular input line 25. According to an embodiment the invention, SAR 10 intelligently schedules which of the incoming data channels is output over interface line 15 based on the cell service decision algorithm described below.

Figure 3B:
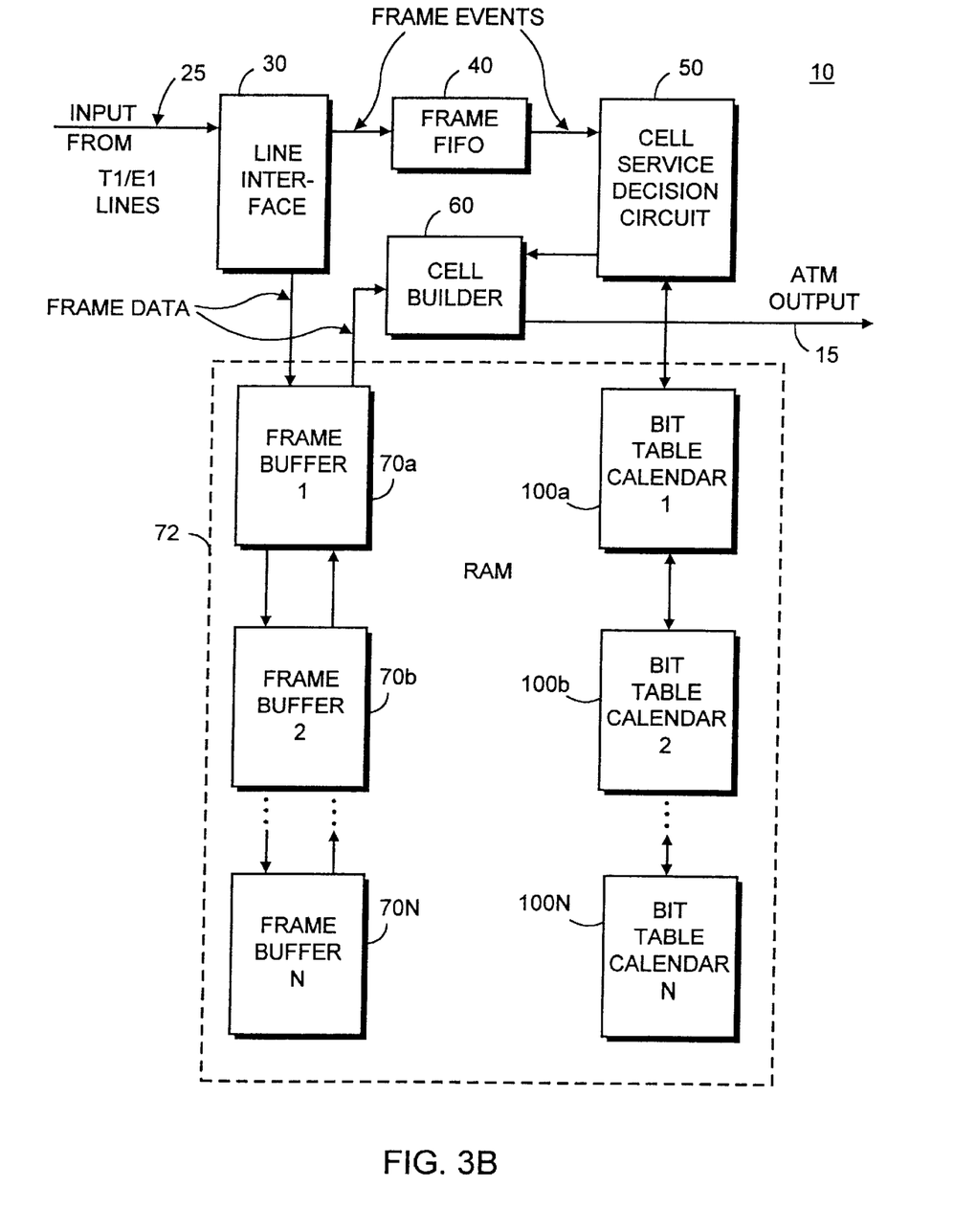
FIG. 3B is a simplified block diagram of an SAR according to an alternative embodiment of the present invention.

It should be noted that while FIG. 3A shows single blocks 70 and 100 for the frame buffer and bit table calendar, in some implementations there may be multiple functionally separate instances of these elements, one for each E1/T1 line, as shown in FIG. 3B.

Figure 4:
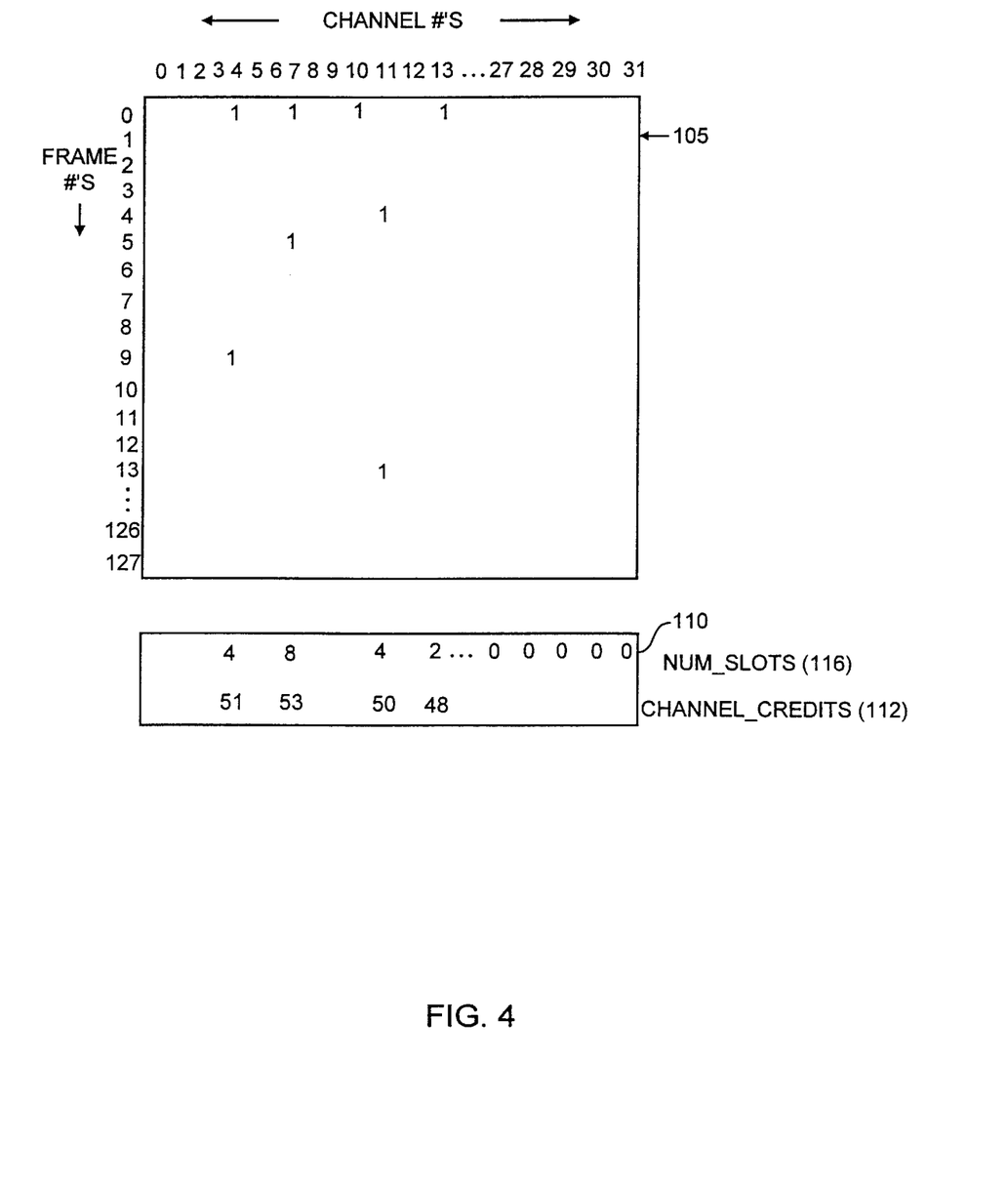
FIG. 4 illustrates a bit table calendar and associated tables according to the invention.

FIG. 4 illustrates a bit-table calendar 100 according to the invention, for one T1/E1 line 25 connected to SAR 10. Calendar 100 contains a 32 bit entry 105 for each frame corresponding to the up to 32 channels possible on an E1 line; only the first 24 bits would be used for a T1 line. Frames are identified by a frame number, which is shown in the drawing at the left side of the table. According to a current specific embodiment, the invention contains memory space to hold up to 128 frames but only schedules cells for a channel up to 47 frames in the future. The number 47 corresponds to the number of frames it would take a channel having only one TDM slot to accrue a cell of data to be sent. A channel of one slot accrues one byte of data during each frame; therefore a one slot channel will have a new 47-byte cell of data to send every 47 frames. Frame numbers are computed in a round-robin fashion, with frame 0 following frame 127.

At the occurrence of a frame on one of its T1/E1 lines, SAR 10 must make a decision as to which cells will be sent out on ATM line 15 during that frame. This decision is made by reading the entry for that frame from the bit table 100 for that T1/E1 line and determining which channels are scheduled to be sent during that frame. In the figure, for example, at frame 0, channels number 4, 7, 10, and 13 are scheduled to be transmitted as indicated by the "1" bit values in the frame 0 entry in the bit table. (In the Figure, blank entries represent either zero or indeterminate values.)

According to one aspect of the invention, when there is more than one channel with a cell to be sent during a particular frame, the cells are always sent according to a consistent order. For example, cells may be sent in a straight numerical order, with a cell from channel 4 always sent before a cell from a higher numbered channel. Sending cells during a frame in an order determined by the channel number tends to further reduce the CDV on a channel, as described below.

During any given frame, the invention must also schedule future cells to be sent. According to the invention, a future cell for a particular channel is scheduled to be sent just after the previous cell for that channel has been sent. The next cell to be sent for a channel is scheduled according to an algorithm referred to as the Cell Service Decision (CSD). In a particular embodiment, this algorithm is implemented by a dedicated circuit referred to as the CSD Circuit (CSDC). In one embodiment of the invention, it is the use of this algorithm that allows for a bit-table calendar to be implemented without the need for complex linked lists.

FIG. 4 also shows an associated table 110 which stores two values for each channel, a NUM_SLOTS value 116 indicating the number of TDM slots assigned to that channel and a CHANNEL_CREDITS value 112 used as described below.

Figure 5:
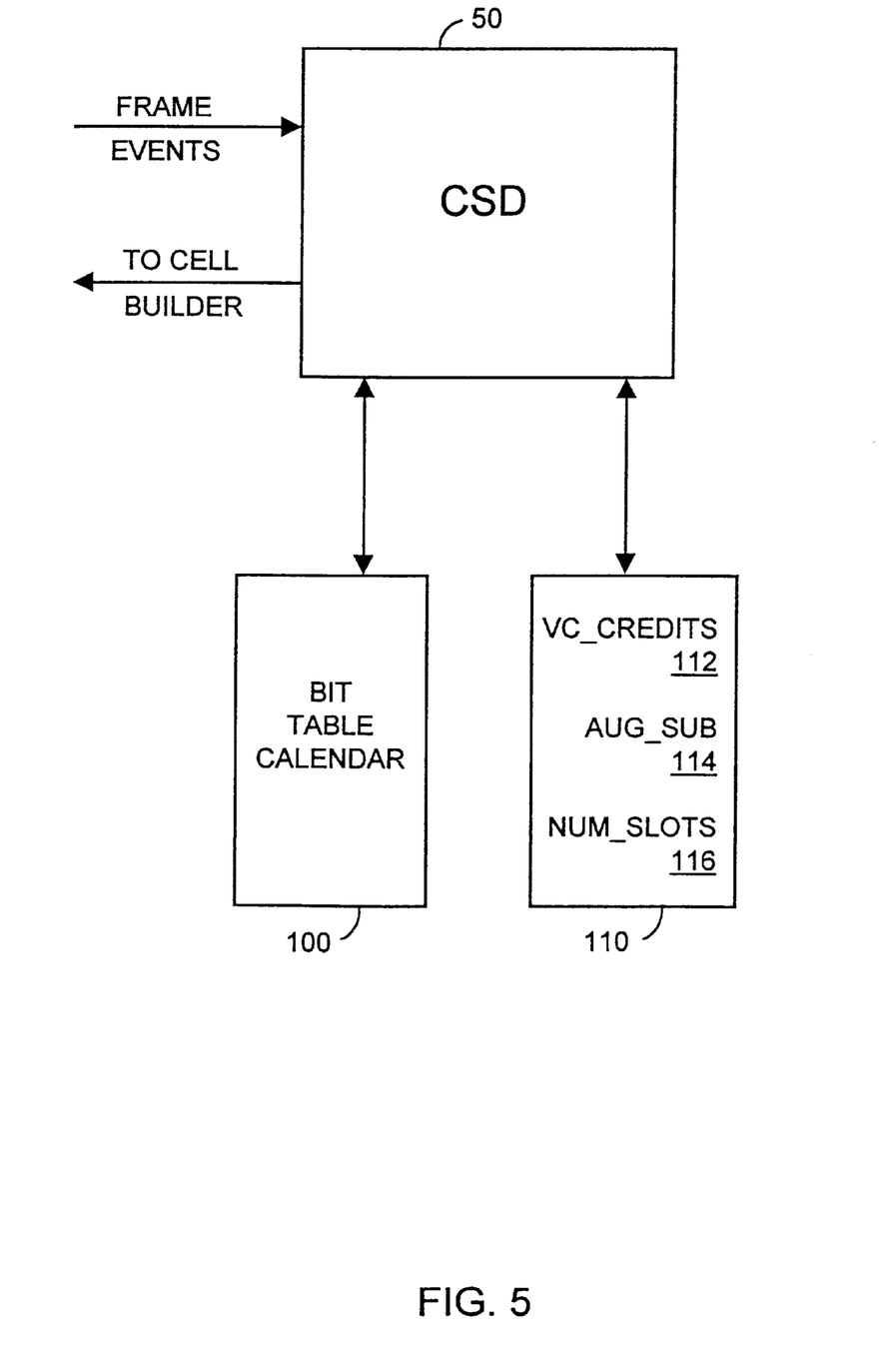
FIG. 5 illustrates a CSD circuit and associated storage according to the invention.

FIG. 5 is a block diagram of a CSDC 50 along with an associated calendar 100 and additional storage space 110 that according to one embodiment of the invention may be used to implement the CSD algorithm.

Figure 6:
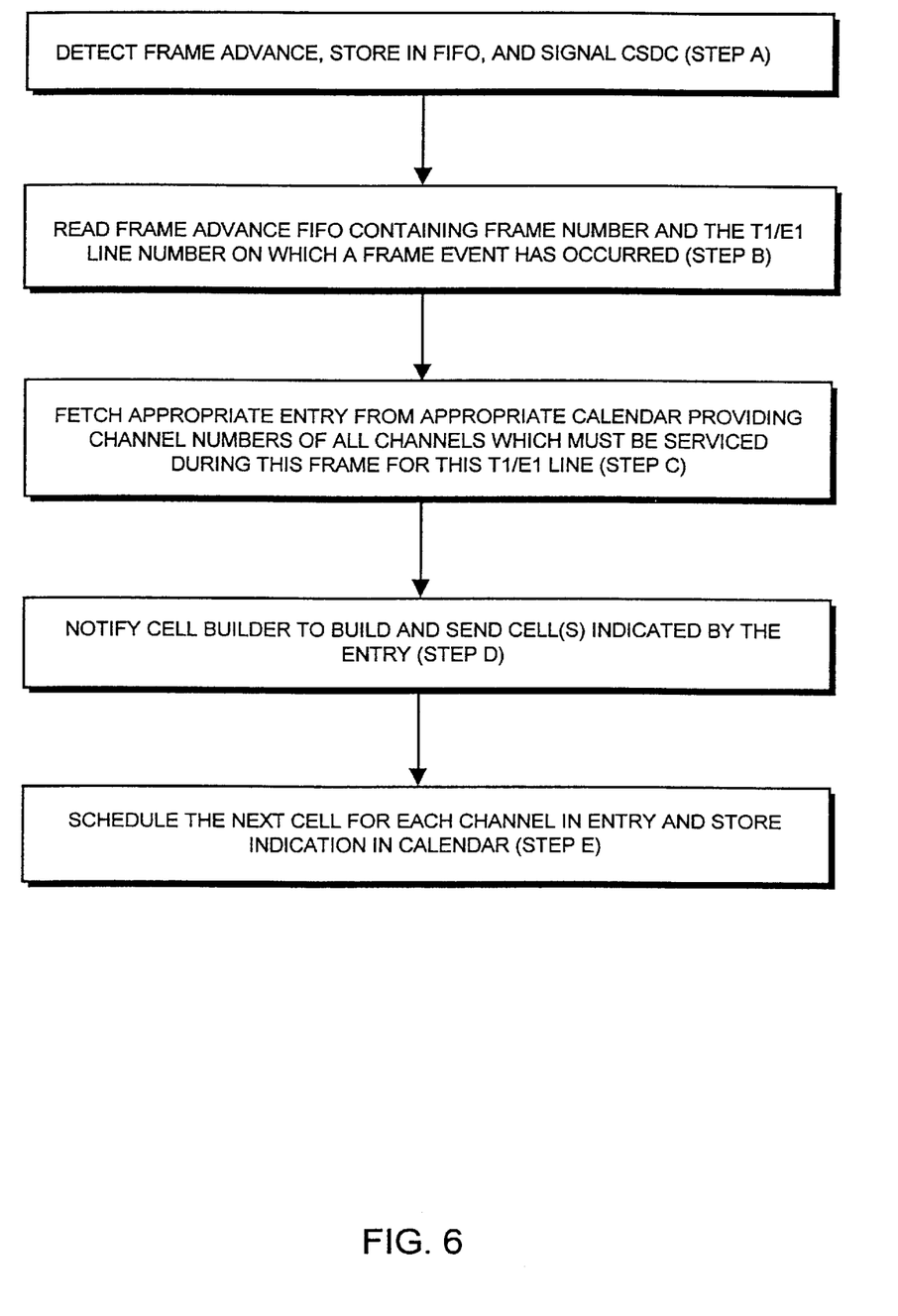
FIG. 6 is a flow chart illustrating a method for sending cells according to the invention.

FIG. 6 is a flow chart illustrating the method employed by CSDC 50. According to the invention, CSD 50 is event driven and its actions are initiated by events written into the frame advanced FIFO 40. The method begins when frame advance FIFO 40 signals CSDC that a frame advance has occurred (Step A). CSDC 50 then reads the available entry from the frame advance FIFO; this entry contains the T1/E1 line number and frame number of a T1/E1 line on which a frame has occurred (Step B). The CSD then reads the appropriate entry from the appropriate calendar 100, which provides the channel numbers of all channels which must be serviced during this frame for this T1/E1 line (Step C). CSDC 50 then notifies cell builder 60 to build and send the cell(s) indicated by the entry in the appropriate calendar 100 (Step D). After the cell builder is told which cell to build, CSDC 50 must then schedule the next cell for that channel to be sent out during a future frame (Step E). The CSDC processes all channels from calendar 100 entry starting with the lowest channel number and proceeding to the highest.

Figure 7:
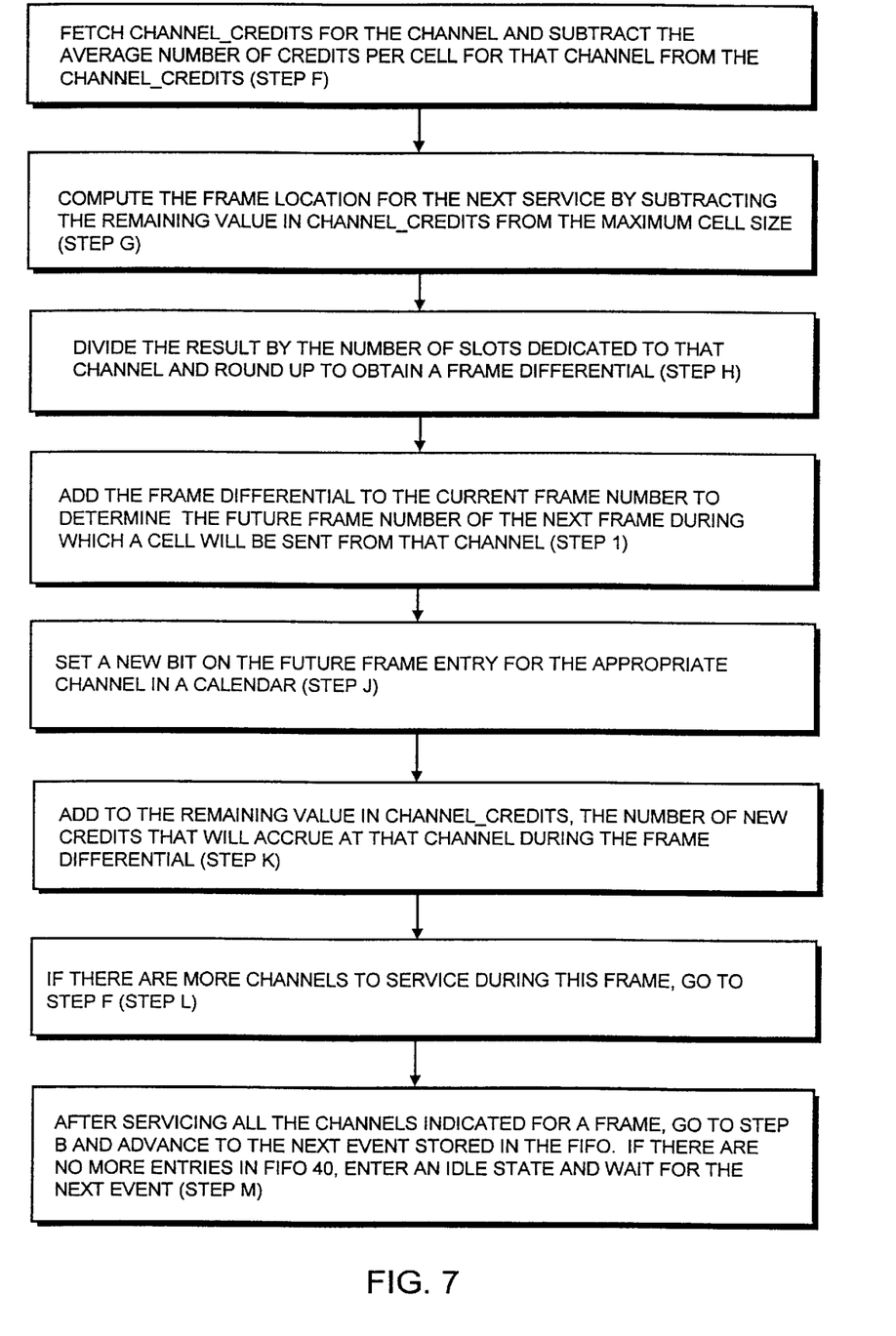
FIG. 7 is a flow chart illustrating a method for scheduling future cells according to the invention.

The processing steps are shown in FIG. 7. First, CSDC 50 obtains the CHANNEL_CREDITS 112 for that channel from storage 110, and subtracts the average number of credits, AVG_SUB_VALU 114, per cell for that channel from the CHANNEL_CREDITS 112 value (Step F). The CHANNEL_CREDITS is a stored value indicating the number of bytes in a channel that are available to be sent during the current frame. In some implementations, it has a fractional component as explained below. AVG_SUB_VALU 114 is the number of credits that will be spent sending the current cell. For structured lines having more than one channel, the average number of credits per cell is 46⅞ths. For unstructured lines having just one channel, the average number of credits per cell is 47. The ⅞th fractional part for structured lines is due to the fact that every 8th cell sent from a structured channel contains only 46 bytes of data, rather than 47. According to a specific embodiment of an SAR, every eighth ATM cell includes an additional SAR header byte for preforming additional network functions.

Next, CSDC 50 computes the frame location for the next service by subtracting the remaining value in CHANNEL_CREDITS 112 from 47 (Step G) and divides the result by the number of slots dedicated to that channel and rounds up (Step H). The result is a value indicating how many frames will elapse before that channel accrues another cell's worth of data. This value is referred to as the frame differential. CSDC 50 then adds this frame differential to the present frame number to determine the frame number of the next frame during which a cell will be sent from that channel (Step I). CSDC 50 then sets a new bit on the future frame entry for the appropriate channel in calendar 100 (Step J). CSDC 50 then adds to the remaining value in CHANNEL_CREDITS 112, the number of bytes (or new credits) that will accrue at that channel during the frame differential. The number of new credits is equal to the frame differential computed earlier times the number of slots assigned to that channels, i.e., if there are six slots assigned to the channel, and the frame differential is 7, then the new credits value will be 42. After servicing all the channels indicated in a calendar entry for a frame, the CSD circuit advances to the next event stored in frame advance FIFO 40 (Step M) and continues the process beginning at Step A. If there are no more entries in FIFO 40, the CSD circuit enters an idle state and waits for the next line attention from FIFO 40.

The following is an example of the calculations CSD circuit 50 performs using specific values. This example assumes a structured T1/E1 line identified as line #1, with a channel #11, which has four slots out of a possible 32 allocated to it.

1. The line interface receives a frame of data from T1/E1 line #1, stores that data in frame buffer 70 and writes an event with identifier line #1, frame #4 to FIFO 40.
2. CSD circuit 50 detects the event stored in FIFO 40 and determines channels for which a cell is ready by reading the frame #4 entry from calendar 100 for T1/E1 line #1 and determining the first set bit in the entry. In this example, it is channel #11. CSD circuit 50 then signals cell builder 60 to build and send the cell.
3. CSD circuit 50 next reads the number of credits for channel #11. This number is always greater than 47 because the channel is ready for service. In this example, CHANNEL_CREDITS=56.625.
4. The CSD circuit subtracts AVG_SUB_VALU, the average number of credits spent per sent cell, from the current credits to get the REMAINING_CREDITS. (For structured lines, the AVG_SUB_VALU is 46⅞ths. For unstructured lines, the AVG_SUB_VALU is 47.):
REMAINING_CREDITS=56.625−46.875
REMAINING_CREDITS=12.5
5. CSD circuit 50 next determines a FRAME_DIFFERENTIAL for the next service for channel #11 from the number of credits needed to exceed 47 and from NUM_SLOT, the number of slots allocated to that channel (remember that each slot holds one byte):
47−12.5=34.5
34.5÷4=8.625
Round 8.625 up, so the frame differential is 9.
6. Therefore, the next cell from this channel will be sent nine frames ahead of the current cell's frame, or at frame #13.
7. CSD circuit 50 computes the number of credits for those nine frames and adds the result to REMAINING_CREDITS to get the CHANNEL_CREDITS value at the time when the next cell is sent from that channel.
New CHANNEL_CREDITS=9×4(NUM_SLOTS)+12.5(REMAINING_CREDITS)=48.5
8. CSD circuit 50 then stores the New CHANNEL_CREDITS in storage memory 110 for retrieval at the next service of channel #11 and sets the bit for channel #11 in the frame number 9 frames ahead of the current frame at frame #13.

Unstructured lines use the same procedure, but may have more than one decision per frame since their data rate may be higher than can be serviced in one frame. The average number of credits spent per cell for unstructured lines is always 47, and the number of slots allocated to the channel is 24 for T1 lines and 32 for E1 lines.

Cell Delay Variation

One of the major criteria used to evaluate a calendar and CSD circuit as implemented by the invention is a value referred to as the cell delay variation or CDV. The CDV measures the variation in cell delay through the circuit that the device produces. This value is also sometimes referred to as jitter. Ideally, the CDV of a device such as SAR 10 would be zero, i.e., the amount of time between two cells output on ATM line 15 for a particular channel would always be the same. This ideal is often impossible to achieve in practice, but the present invention comes close to this ideal in three somewhat independent ways: (1) by scheduling cells to be sent out during a frame according to the CSD described above, (2) by servicing T1/E1 lines in the order in which frame events occur on them as determined by FIFO 40, and (3) by servicing channels within a T1/E1 line in the same order each time a frame entry is read from a calendar 100. In summary, the CSD scheduling of the invention assures that a cell is sent out from a channel during the frame immediately after there is enough data available in that channel. With a constant rate channel, the space between frames will always be nearly equal, except subject to rounding as shown in the example above.

Embodiment with minimized CDV

In a calendar scheduling algorithm, CDV is minimized when the number of active channels remains constant. For instance in FIG. 4, Frame #0 has 4 bits set in the calendar. This means that four cells must be generated during this frame. Since the priority scheme in one embodiment is fixed, channel 4 will be serviced first, followed by channel 7, followed by channel 10 and finally followed by channel 13. As long as channel 4, 7 and 10 remain active, the CDV of channel #13 will remain quite low, because it will always be serviced fourth during that frame. The delay of channel #13 with respect to the frame event is the amount of time it takes to process channels 4, 7 and 13. However if channels 4, 7 and 13 become disabled, the delay for #13 goes to 0, which results in a CDV equal to the amount of delay that previously existed.

Multiple cells being scheduled within a given frame in a calendar is referred to as clumping. Because voice traffic is sensitive to CDV and clumping causes CDV, in this aspect the invention includes a mechanism to avoid clumping, even when the system is continually activating and deactivating channels. However, because channels can be added at any time, the system must know where (e.g. in which frame) previously added channels are scheduled in order to know where to add a new channel to avoid clumping. Because the calendar is quite large, it is possibly stored in either internal or external RAM, which means that when a new channel is added, the system must read each frame of the calendar from RAM until it finds an available one. This can be very time consuming. The system also preferably would activate the queue as soon as possible so the area of interest are the frames immediately subsequent to the current location within the calendar.

In ATM, cells are generally, at most, 47 bytes, therefore the least often a cell can be scheduled is every 47 frames, where one byte is taken from each frame. In an E1/T1 line, the most channels that can be activated are 32 and 24 respectively. Therefore, if the system were to maintain an internal 48 bit word that contained an OR of all active channels of the next 48 frames of the calendar for that line, it would be easy to see the next available frame to add a channel. The length of 48 bits is long enough so that when any new or existing channel is scheduled the appropriate bit can be set, and since 48 is greater than 32 (the maximum number of channels activated in an E1 line), there will always be an available frame. In order for this process to work the 48 bit word will slide by one bit as each frame passes.

Figure 8:
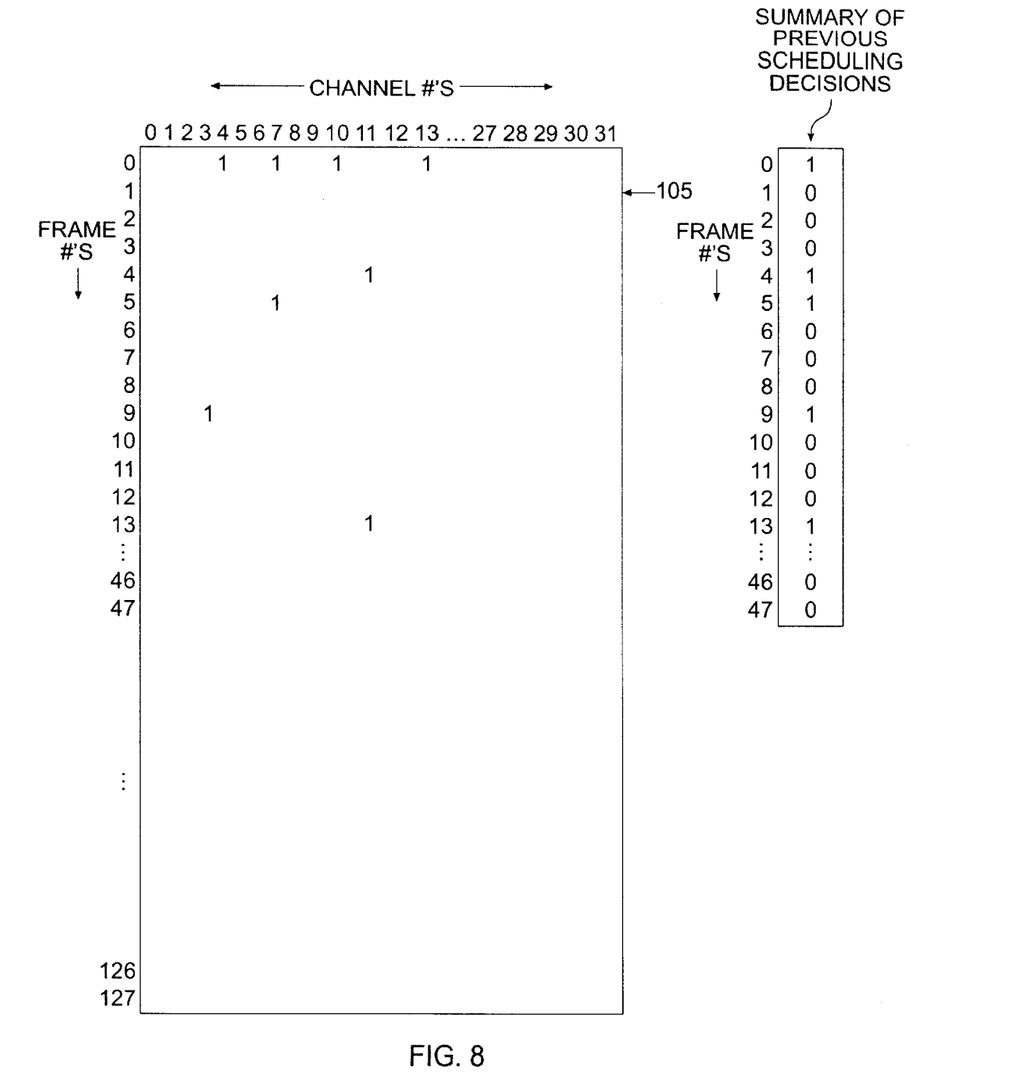
FIG. 8 illustrates a bit table calendar and an associated table in accordance with one embodiment of the present invention.

As an example, referring concurrently to FIGS. 4 and 8, if the current frame was frame 0 the value of the 48 bit word would be "10001100010001000000000000000 . . . 0" indicating that the current frame (0), the frame four later (4), five later(5) nine later (9) and 13 later (13) were the frames with channels scheduled. When the frame increments to frame 1, then the value of the 48 bit word would be "00011000100010000 . . . 0", indicating that, the frame three later (4), four later(5) eight later (9) and 12 later (13) were the frames with channels scheduled.

Therefore, according to this aspect of the invention, all that is required is to keep a copy of the 48 bit word, update it each time a bit is set in the calendar, and shift it each time a frame increments. This will allow channels within a given line to be distributed across different frames.

In a further aspect of the invention, to minimize the clumping that can occur across multiple lines the frame events of the different lines are staggered in time so that frame events do not happen at the same time. Ideally the frame events are staggered equi-distances apart.

The invention has now been explained in accordance with specific embodiments, however many variations will be obvious to those of skill in the art. The invention should therefore not be limited except as provided in the attached claims.

What is claimed is:

1. A calendar in a communication interface unit for scheduling cells to be sent from one of a plurality of channels, said interface connecting a plurality of incoming channels of data to a cell-based transmission medium comprising:

a bit table for scheduling cells to be sent, said bit table scheduling future cells to be sent based on events occurring on said plurality of channels, said bit table storing the timing of future cells to be sent by setting a bit in a location of said bit table corresponding to a future event on said plurality of channels and to a particular channel; and a cell service decision circuit for determining when in the future a cell from a particular channel should be sent and for setting bits in said bit table in response to said determining, wherein a previous history of channels scheduled in frames determines in which frames new channels are added.

2. A calendar according to claim 1 wherein said previous history is stored in a sliding window bit stream which indicates the location of open frames.

3. A calendar in a communication interface unit for scheduling cells to be sent from one of a plurality of channels, said interface connecting a plurality of incoming channels of data to a cell-based transmission medium comprising:

a bit table for scheduling cells to be sent, said bit table scheduling future cells to be sent based on events occurring on said plurality of channels, said bit table storing the timing of future cells to be sent by setting a bit in a location of said bit table corresponding to a future event on said plurality of channels and to a particular channel; and a cell service decision circuit for determining when in the future a cell from a particular channel should be sent and for setting bits in said bit table in response to said determining, wherein frame events are offset within portions of a calendar scheduling algorithm in order to minimize the chance of clumping.

* * * * *